(12) United States Patent
Lehmann (10) Patent No.: US 10,841,374 B2
(45) Date of Patent: Nov. 17, 2020

(54) DYNAMIC SHARDING FOR STATE-BASED PROCESSING

(71) Applicant: McAfee, Inc., Santa Clara, CA (US)

(72) Inventor: John Lehmann, Santa Clara, CA (US)

(73) Assignee: MCAFEE, LLC, San Jose, CA (US)

( * ) Notice: Subject to any disclaimer, the term of this patent is extended or adjusted under 35 U.S.C. 154(b) by 525 days.

(21) Appl. No.: 14/923,111

(22) Filed: Oct. 26, 2015

(65) Prior Publication Data
US 2017/0118281 A1 Apr. 27, 2017

(51) Int. Cl.
*H04L 29/08* (2006.01)

(52) U.S. Cl.
CPC ...... *H04L 67/1097* (2013.01); *H04L 67/1095* (2013.01); *H04L 67/2852* (2013.01)

(58) Field of Classification Search
CPC ............. H04L 67/2852; H04L 67/1095; H04L 67/1097; G06F 17/30067
USPC ........................................................ 709/219
See application file for complete search history.

(56) References Cited

U.S. PATENT DOCUMENTS

| | | | |
|---|---|---|---|
| 7,136,882 B2 * | 11/2006 | Collins | G06F 3/0601 |
| 7,548,898 B1 * | 6/2009 | Tarenskeen | G06F 16/214 |
| 9,026,760 B1 | 5/2015 | Marshak et al. | |
| 2004/0039891 A1 | 2/2004 | Leung et al. | |
| 2006/0195666 A1 * | 8/2006 | Maruyama | G06F 3/065 |
| | | | 711/162 |
| 2007/0038681 A1 * | 2/2007 | Pierce | G06F 11/1464 |
| 2007/0198797 A1 * | 8/2007 | Kavuri | G06F 3/061 |
| | | | 711/165 |
| 2009/0049320 A1 | 2/2009 | Dawkins et al. | |
| 2011/0179415 A1 * | 7/2011 | Donnellan | G06F 9/45558 |
| | | | 718/1 |
| 2012/0079096 A1 * | 3/2012 | Cowan | H04L 67/104 |
| | | | 709/224 |
| 2012/0137087 A1 | 5/2012 | Umimura | |
| 2014/0006354 A1 * | 1/2014 | Parkison | G06F 3/067 |
| | | | 707/649 |
| 2014/0047062 A1 * | 2/2014 | Krueger | H04L 67/2842 |
| | | | 709/216 |
| 2014/0089594 A1 * | 3/2014 | Long | H04L 29/08729 |
| | | | 711/133 |
| 2014/0108474 A1 * | 4/2014 | David | G06F 16/182 |
| | | | 707/827 |
| 2014/0215172 A1 * | 7/2014 | Tsirkin | G06F 11/203 |
| | | | 711/162 |
| 2015/0149719 A1 | 5/2015 | Shuster | |

OTHER PUBLICATIONS

International Search Report and Written Opinion of the International Search Authority, dated Jan. 25, 2017, 12 pages.
International Bureau, "International Preliminary Report on Patentability," dated May 11, 2018 in connection with International Patent Application No. PCT/US2016/055144, 8 pages.

* cited by examiner

*Primary Examiner* — Tonia L Dollinger
*Assistant Examiner* — Jonathan A Sparks
(74) *Attorney, Agent, or Firm* — Hanley, Flight & Zimmerman, LLC (57) ABSTRACT

Enabling a distributed data processing system to process a data set from local storage devices by dynamically reallocating portions of the data set.

20 Claims, 7 Drawing Sheets

DYNAMIC SHARDING FOR STATE-BASED PROCESSING

TECHNICAL FIELD

Embodiments described herein generally relate to distributed data processing and in particular to enabling a distributed data processing system to process a data set from local storage devices by dynamically reallocating portions of the data set.

BACKGROUND ART

In some data processing applications, a system can process a large amount of data by processing many smaller sets of data in sequence. Other data processing applications, however, require that the entire data set be persistently available for processing. For example, when looking at a large data set to identify correlations between two or more data points, the system must be able to access the full data set in order to identify if any data points are correlated.

While a large data set (e.g., several petabytes or more) can be stored on a single storage device and processed using a single hardware element, it is preferable to process a large data set using multiple nodes of a distributed computing system so that the data can be processed more quickly. Making the large data set available to multiple nodes of a distributed computer system, however, presents its own set of challenges.

Figure 1:
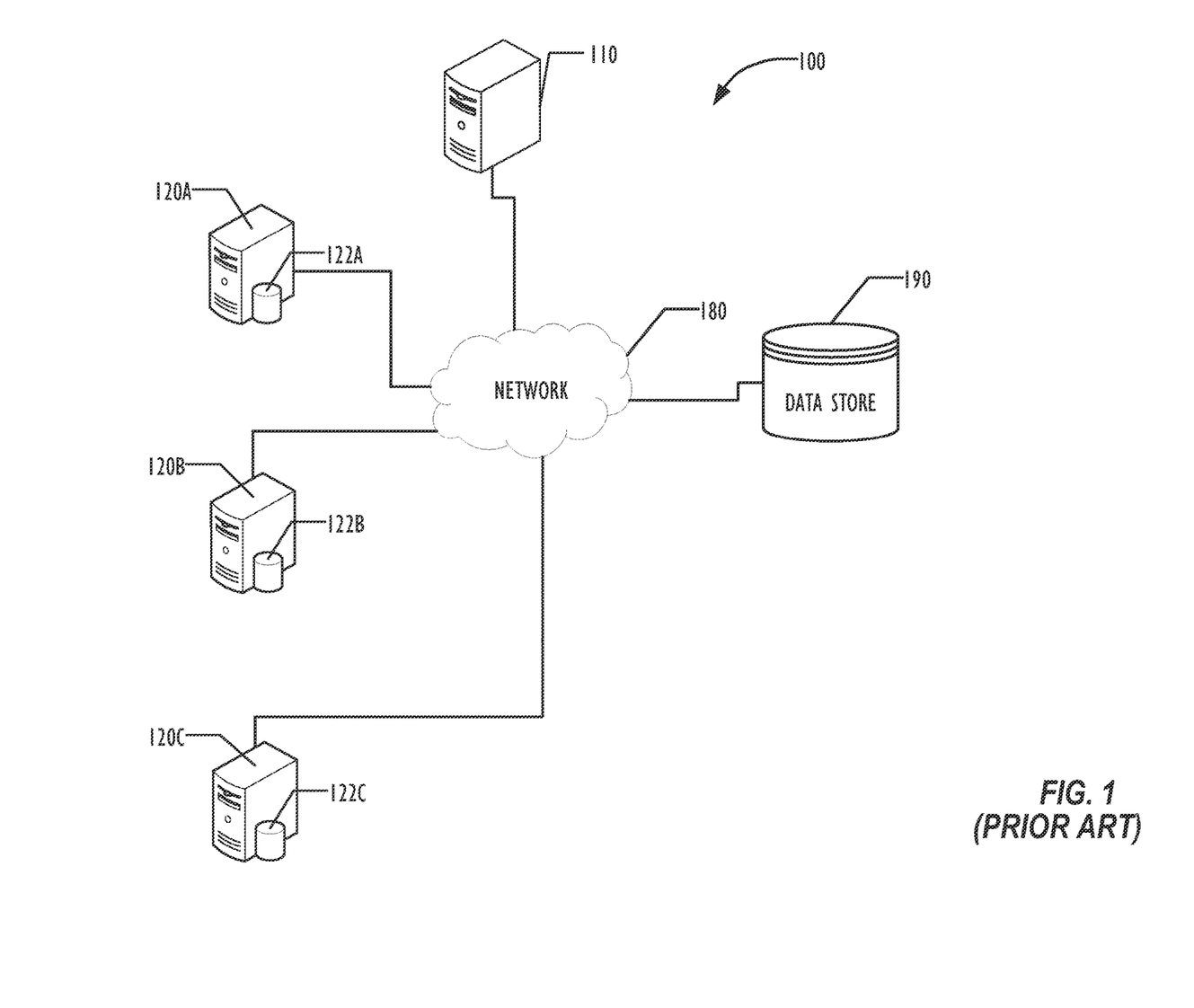
FIG. 1 is a block diagram illustrating a conventional distributed data processing system.

FIG. 1 is a block diagram illustrating a conventional distributed data processing system 100 where a controller 110, a cluster of nodes (e.g., three nodes 120a through 120c, each including a local storage device 122a-c), and a data store 190 communicate via a network 180. The controller 110 outputs instructions to the nodes 120a-c and the data store 190. Each node 120 can quickly access data stored on the local data storage device 122 associated with the node 120. For each node 120 to access data stored on the data store 190, however, the data must first be transferred to the local data storage device 122. Ideally, the entire data set would be divided and stored on the local storage devices 122a-c so that the nodes can quickly process the data. However, because the storage capacity of each of the local storage devices 122 is finite and it is not always possible to predict how much memory will be required by each node 120, one or more of the local storage devices 122 may run out of space.

Therefore, the conventional distributed data processing system 100 stores the majority of the data in the data store 190 and only stores a small subset of the data in the local storage devices 122. For example, the node 120a may be responsible for analyzing a database with 6 billion keys with all 6 million keys (and associated data) stored in the data store 190. The local data storage device 122a may store a small subset of that database (e.g., the most-recently used 100,000 keys and associated data). This process ensures that the local storage device 122 does not run out of space, but increases processing time each time the node 120a must access a record that is stored in the data store 190.

For some data processing applications, where cardinality is low, keeping a small subset of the data set in the local storage devices 122 may be sufficient. In other words, it may be possible to predict which data records to store locally with reasonable accuracy or the additional time to transfer some data records from the data store 190 may be an acceptable. In other data processing applications, however, it may be difficult or impossible to predict which data records should be stored locally.

Regardless of the predictability of the data set, partitioning and storing the entire data set on local storage devices 122 reduces processing time and eliminates the need to predict which records are best stored locally. Accordingly, there is a need for a distributed data processing system that processes a large data set from local storage devices while ensuring that the local storage devices do not run out of storage capacity.

DESCRIPTION OF EMBODIMENTS

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

As used herein, the term "system" refers to a single computer or a plurality of computers working together to perform the function described as being performed on or by a computer system.

As used herein, the term "node" refers to any computing device that is capable of connecting to a network. Such devices include, but are not limited to, personal computers, desktop computers, multiprocessor systems, mobile computing devices, microprocessor-based or programmable consumer electronics, network PCs, servers, network appliances, cellular phones, PDAs, or the like. Such devices may employ a wired and/or a wireless mechanism to connect to the network.

As used herein, the term "cluster" refers to a set of nodes connected by a network. Multiple nodes within a cluster may cooperate to perform the same task. The nodes within a cluster may be connected by a local area network ("LAN"), a wide area network ("WAN"), and/or the internet. Each node with a cluster may run its own instance of the same operating system. The nodes within a cluster may include the same or similar hardware.

As used herein, the term "state" refers all stored information, at a given instant in time, to which a node has access. State may be stored in random access memory (RAM) or may be persisted to non-volatile storage such as a hard drive or flash memory.

As used herein, the term "controller" refers any hardware element or software module that outputs instructions for controlling any computing device, such as a node, a cluster of nodes, and/or distributed cache.

As used herein, the term "distributed cache" refers to a storage device that stores data. The data stored in a distributed cache might be the results of an earlier computation, or the duplicates of data stored elsewhere. The distributed cache may receive data from multiple nodes via a network. A distributed cache may grow in size to store the output from the nodes, referred to by those of ordinary skill in the art as an "elastic cache." The distributed cache may include volatile random access memory (RAM) or non-volatile storage such as a hard drive or flash memory.

As used herein, the term "sharding" refers to partitioning a larger database into multiple smaller sets of data (sometimes referred to as "shards").

As used herein, the term "security information and event management (SIEM)" refers to real-time analysis of security alerts generated by network hardware and applications. SIEM may include aggregating data from multiple sources (e.g., network devices, security devices, servers, databases, applications, etc.), consolidating monitored data, correlating data/events, automating analysis of correlated data/events, outputting alerts (e.g., via email, a dashboard, etc.), identifying patterns or converting event data into charts to assist identifying patterns, gathering and/or outputting compliance data, storing historical data to facilitate correlation of data over time, retaining historical data for compliance requirements and/or for future analysis, and/or searching across logs on different nodes and time periods based on specific criteria. SIEM functions are sometimes referred to as Security information management (SIM) and/or security event management (SEM).

Figure 2:
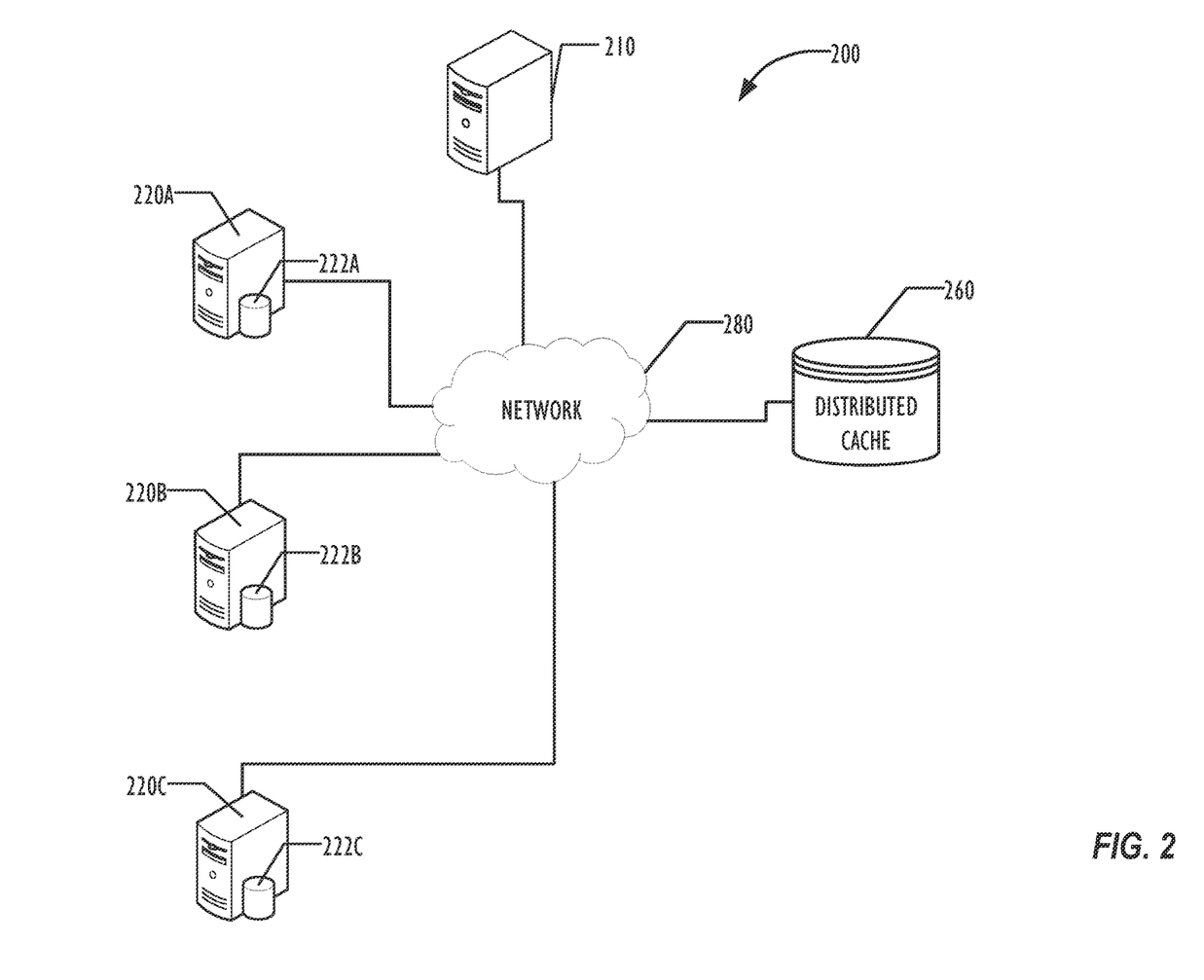
FIG. 2 is a block diagram illustrating a distributed data processing system according to an embodiment.

FIG. 2 is a block diagram illustrating a distributed computing system 200 according to an embodiment. The system 200 includes a controller 210, a cluster of nodes (e.g., three nodes 220a through 220c each including a local storage device 222a-c), a distributed cache 260, and a network 280.

To mitigate the effects of a node failure, each node 220 periodically persists the data stored in the associated local storage device 222 to the distributed cache 260. For example, the node 220a may output its state from the local storage device 222a to the distributed cache 260. In response to a determination that the node 220a has failed, the controller 210 may cause the previously recorded state of the node 220a to be transferred from the distributed cache 260 to the storage device 222c and the node 220c may continue processing the data in the same manner as was previously done by node 220a. To mitigate the effects of a node failure, a node 220 may output information indicative of the entire data set stored on the local storage device 222 associated with the node 220 or information indicative of the changes to the data since the last time the node 220 persisted its state to the distributed cache 260.

As described below, the system 200 also ensures that the local storage devices 222 do not run out of storage capacity using a technique of dynamically balancing the data stored on the local storage devices 222a-c called "dynamic sharding."

Figure 3:
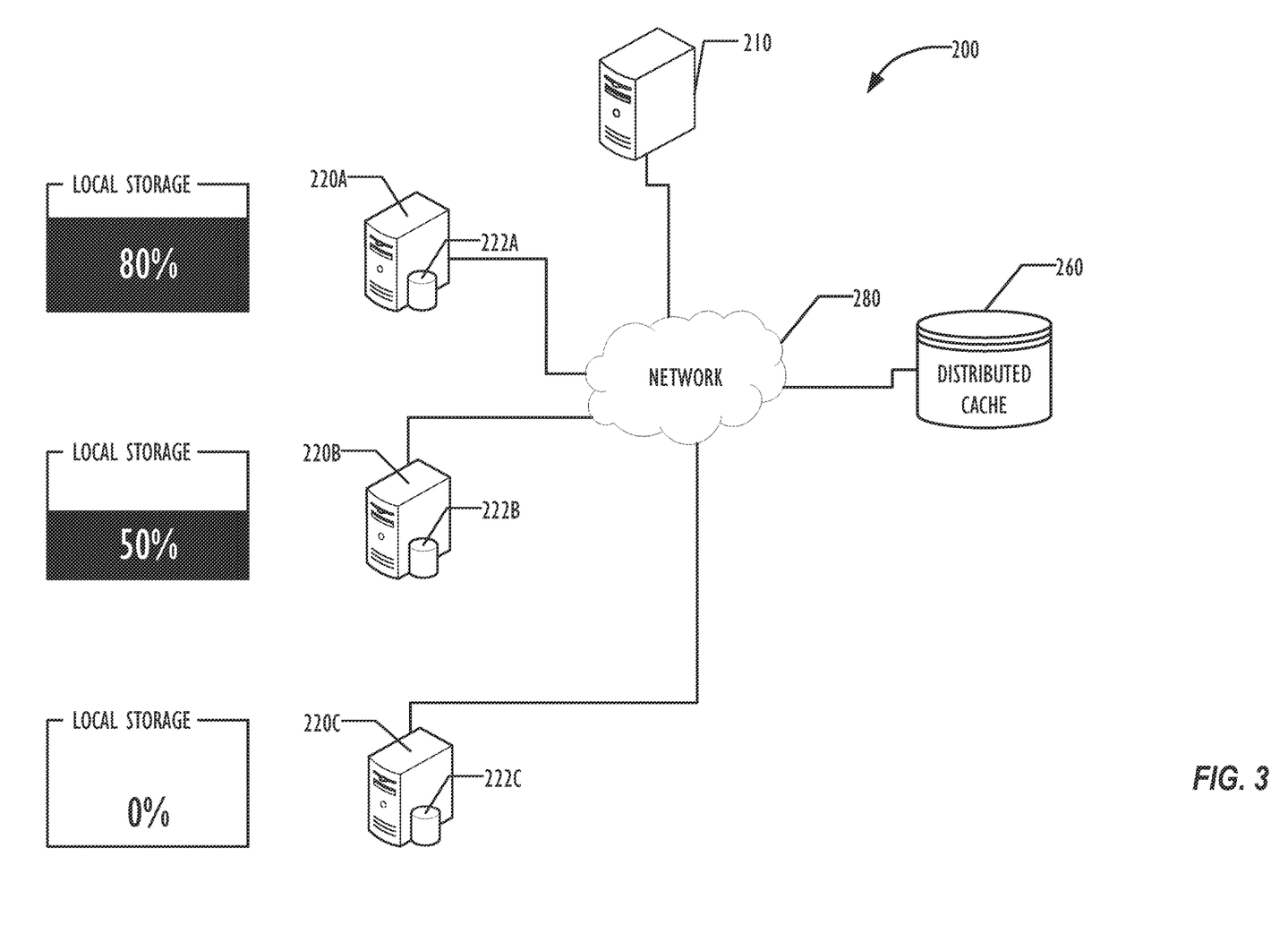
FIGS. 3-4 are block diagrams illustrating a distributed data processing system according to an embodiment.

As shown in FIG. 3, for example, the storage device 222a may be operating at 80 percent capacity while the storage device 222b is operating at 50 percent capacity. In the example shown in FIG. 3, the node 220c is idle and, therefore, the storage device 222c is operating at 0 percent capacity. The node 220a may reallocate a portion of the data stored on the local storage device 222a by outputting that data to the distributed cache 260 for transfer to the local storage device 222c. For example, the system 200 may be configured such that if a local storage devices 222a reaches a predetermined threshold (e.g., 80 percent), the node 220 outputs a portion of the data stored on the local storage device 222 to the distributed cache 260 for transfer to another local storage device 222.

Figure 4:
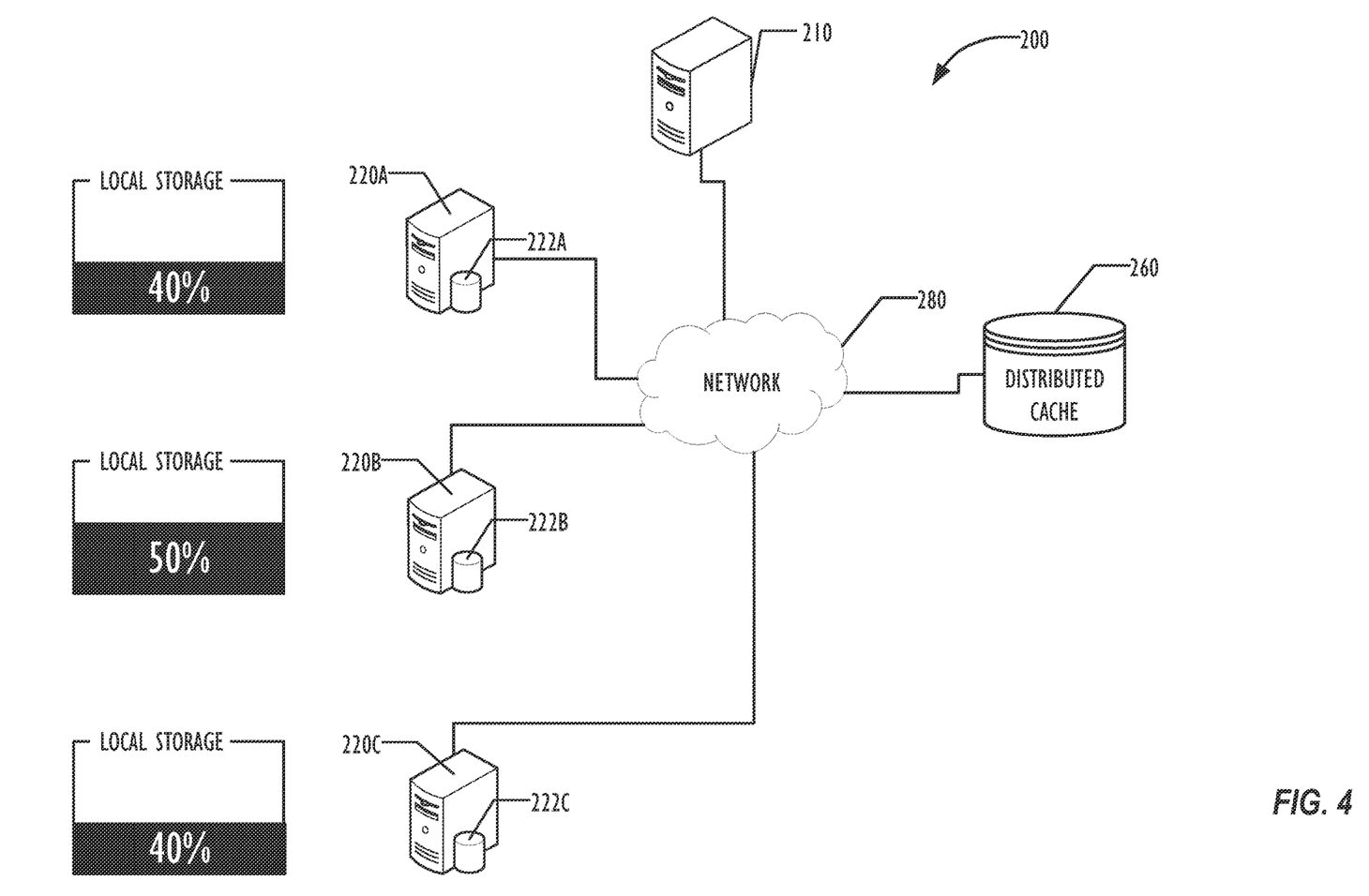

In the example shown in FIGS. 3-4, the node 220a outputs half the data stored on the local storage device 222a to the distributed cache 260 for transfer to the local storage device 222c. (In other embodiments, the node 220a may output any portion of the data to any number of nodes. For example, the node 220a may output two-thirds of the data stored on the local storage device 222a with two nodes each receiving one-third of the data previously stored on the storage device 222a. The node 220a may output the data for processing by one or more nodes that are currently idle or that are currently processing data but have available local storage capacity.) Accordingly, as shown in FIG. 4, the system ensures that all of the local storage devices 222 are below the predetermined threshold.

In order to ensure that the system 200 has the capacity to process an entire data set locally, the system 200 only requires enough nodes 220 with sufficient local storage to store the entire data set. If the data set grows, a system operator can simply add additional nodes 220 with local storage devices 222 and the system 200 will dynamically reallocate portions of the data set to the additional local storage devices 222 as needed.

The system 200 may be any distributed computing system configured to process any data. In one embodiment, the system 200 is configured to identify correlations in the data for the purposes of security information and event management (SIEM).

Partitioning the data stored in local storage device 222a as illustrated in FIG. 3 (such that it can be stored in the local storage devices 222a and 222c in FIG. 4) is referred to as sharding. The system 200 may be configured to partition the data in any suitable manner. When partitioning data used to identify correlations as described above, it is preferable that the system 200 partitions the data based on the correlation factor. For example, if the system 200 is configured to correlate one piece of data regarding a user and another piece of data regarding the same user (but is not configured to correlate the actions of multiple users), the system 200 may partition the data based on the identity of the users. Therefore, all of the data regarding each user is stored on the same local storage device 222 and is processed by the same node 220.

Figure 5:
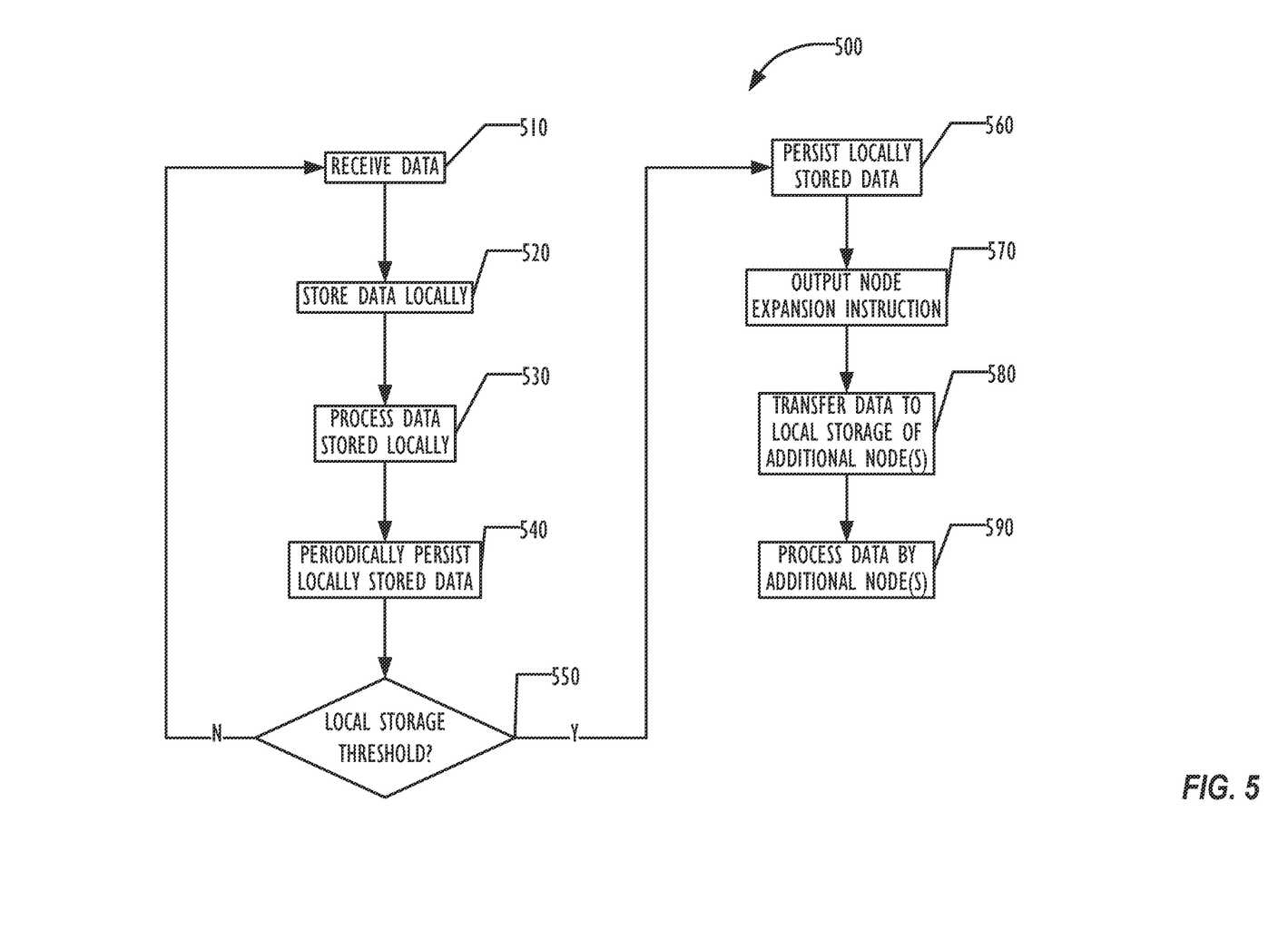
FIG. 5 is a flowchart illustrating a technique for dynamically reallocating locally-stored data in the distributed data processing system illustrated in FIGS. 2-4 according to one embodiment.

FIG. 5 is a flowchart illustrating a technique 500 for dynamically reallocating locally-stored data in a distributed data processing system 200 according to one embodiment. Data is received by the system 200 in block 510. The data is stored in a local storage device 222a in block 520. The data stored in the local storage device 222a is processed by a node 220a in block 530. The node 220a periodically persists the data stored in the local storage device 222a to a distributed cache 260 in block 540 so that, in the event that the node 220a fails, the data can be recovered and transferred to another node 220b-c for processing.

In block 550, the node 220a determines whether the amount of data stored on the local storage device 222a has reached a predetermined threshold (for example, 80 percent of the total capacity of the local storage device 222a). If not, the node 220a continues receiving, processing, and periodically backing up the data in blocks 510-540.

If the node 220a determines in block 550 that the amount of data stored on the local storage device 222a has reached a predetermined threshold, the node 220a outputs a portion of the data stored on the local storage device 222a to the distributed cache 260 in block 560 and outputs an instruction to the controller 210 in block 570. In response to the instruction from the node 220a, the controller 210 transfers the data previously stored in the local storage device 222a from distributed cache 260 to at least one other node in block 580. For example, the data output by the node 220 may be transferred to the local storage device 222c in block 580. The additional node(s) (in this example, the node 220c) processes the data locally in block 590.

The technique described above is an efficient way to reallocate data among the local storage devices 222 because it uses some of the same processes that are used to mitigate the effects of a node failure. As described above, each node 220 may already be configured to periodically persist its state to the distributed cache 260. Similarly, in response to a determination that the amount of data stored on a local storage device 222 has reached a predetermined threshold, the node 220 associated with the local storage device 222 outputs a portion of the data to the distributed cache 260. The technique for transferring data from the distributed cache 260 to an additional node 220 may also be similar regardless of whether a node 220 has failed or whether a local storage device 222 has reached the predetermined threshold.

Because of the similarities between the dynamic sharding technique and node failure technique, in some embodiments the system 200 may execute a single set of computer executable instructions in response to either a node failure or an indication from a node 220 that the associated local storage device 222 has reached the predetermined threshold. In particular, the controller 210 may execute many of the same process steps to transfer data from the distributed cache 260 to another node 220 regardless of whether a node has failed or whether a local storage device 222 reached a predetermined threshold. In other embodiments, the process steps for dynamic sharding and node failure may be implemented as separate computer executable instructions.

Whether the dynamic sharding and node failure techniques are implemented as a single process or separate processes, the system 200 may be configured to perform additional process steps depending in response to a determination that a local storage device 222 has reached a predetermined threshold. For example, because the data stored in the local storage device 222 may have changed since the last time the node 220 persisted its state to the distributed cache 260, the node 220 may immediately begin the process of outputting the data to the distributed cache 260 in response to the determination that the amount of data stored on a local storage device 222 has reached a predetermined threshold.

The local storage devices 222 may be any computer readable storage medium. In a preferred embodiment, the local storage device 222 is a high speed storage medium such as random access memory (RAM). The distributed cache 260 may include one or more computer readable storage media. In a preferred embodiment, the distributed cache includes at least one high speed storage medium, such as RAM, of sufficient size as to receive all of the data stored on one of the local storage devices 222, and nonvolatile memory (e.g., a solid state hard drive) with enough capacity to store the entire data set. In the preferred embodiment described above, when one of the local storage devices 222 persists its state to the distributed cache 260 (either to back-up the data in case of node failure or for transfer to another node), the distributed cache 260 quickly reads the data output by the node 220 into RAM and then transfers the data to nonvolatile memory. The distributed cache 260 may include a cluster of high speed storage mediums to quickly read in data output by a plurality of nodes. The distributed cache 260 may be an elastic cache that is expandable to accommodate additional nodes 220 that may be added to the system 200.

Figure 6:
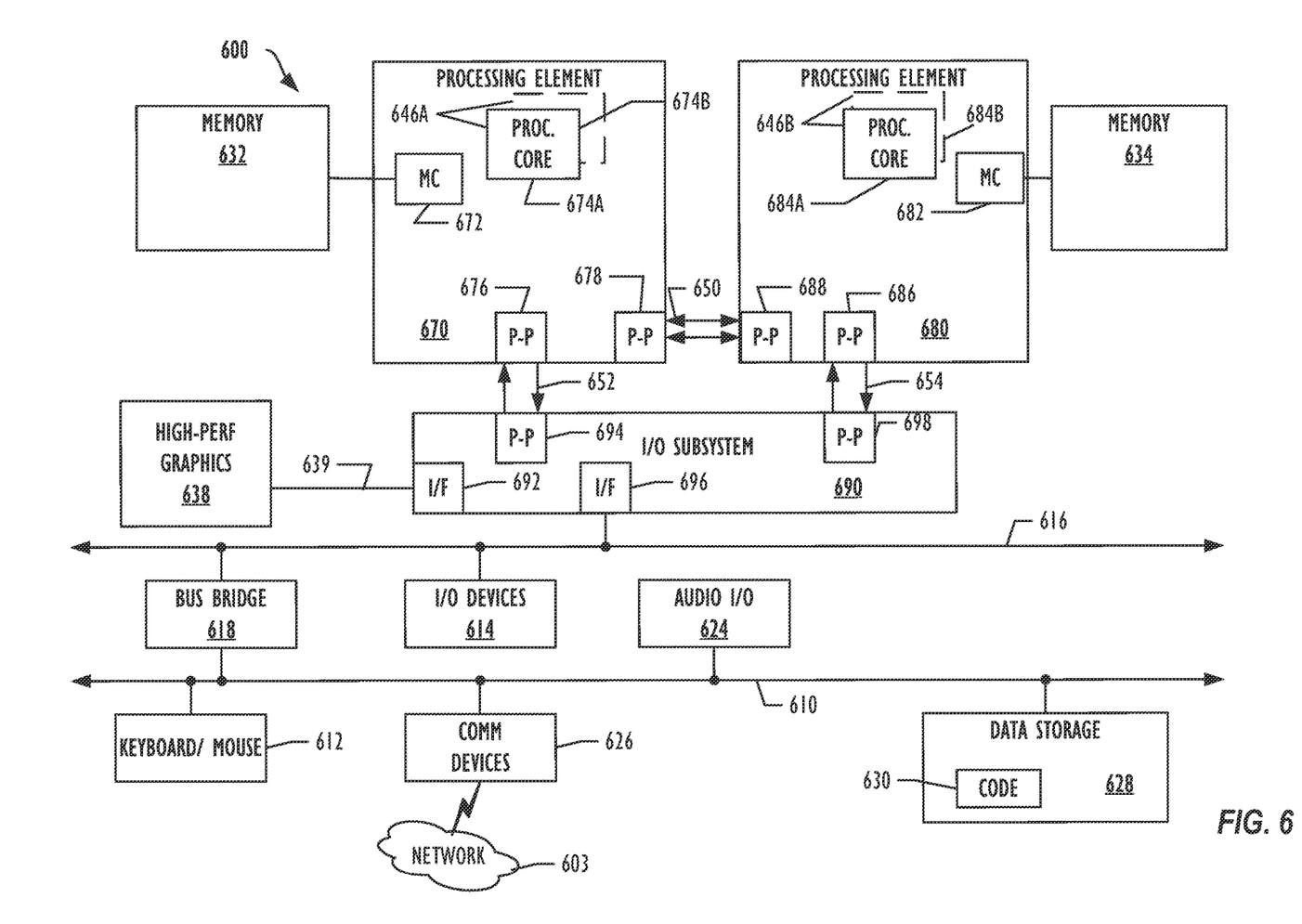
FIG. 6 is a block diagram illustrating a computing device that may be used as node according to one embodiment.

Referring now to FIG. 6, a block diagram illustrates a programmable device 600 that may be used for implementing the techniques described herein in accordance with one embodiment. The programmable device 600 illustrated in FIG. 6 is a multiprocessor programmable device that includes a first processing element 670 and a second processing element 680. While two processing elements 670 and 680 are shown, an embodiment of programmable device 600 may also include only one such processing element.

Programmable device 600 is illustrated as a point-to-point interconnect system, in which the first processing element 670 and second processing element 680 are coupled via a point-to-point interconnect 650. Any or all of the interconnects illustrated in FIG. 6 may be implemented as a multi-drop bus rather than point-to-point interconnects.

As illustrated in FIG. 6, each of processing elements 670 and 680 may be multicore processors, including first and second processor cores (i.e., processor cores 674a and 674b and processor cores 684a and 684b). Such cores 674a, 674b, 684a, 684b may be configured to execute instruction code. However, other embodiments may use processing elements that are single core processors as desired. In embodiments with multiple processing elements 670, 680, each processing element may be implemented with different numbers of cores as desired.

Each processing element 670, 680 may include at least one shared cache 646. The shared cache 646a, 646b may store data (e.g., instructions) that are utilized by one or more components of the processing element, such as the cores 674a, 674b and 684a, 684b, respectively. For example, the shared cache may locally cache data stored in a memory 632, 634 for faster access by components of the processing elements 670, 680. In one or more embodiments, the shared cache 646a, 646b may include one or more mid-level caches, such as level 2 (L2), level 3 (L3), level 4 (L4), or other levels of cache, a last level cache (LLC), or combinations thereof.

While FIG. 6 illustrates a programmable device with two processing elements 670, 680 for clarity of the drawing, the scope of the present invention is not so limited and any number of processing elements may be present. Alternatively, one or more of processing elements 670, 680 may be an element other than a processor, such as an graphics processing unit (GPU), a digital signal processing (DSP) unit, a field programmable gate array, or any other programmable processing element. Processing element 680 may be heterogeneous or asymmetric to processing element 670.

There may be a variety of differences between processing elements 670, 680 in terms of a spectrum of metrics of merit including architectural, microarchitectural, thermal, power consumption characteristics, and the like. These differences may effectively manifest themselves as asymmetry and heterogeneity amongst processing elements 670, 680. In some embodiments, the various processing elements 670, 680 may reside in the same die package.

First processing element 670 may further include memory controller logic (MC) 672 and point-to-point (P-P) interconnects 676 and 678. Similarly, second processing element 680 may include a MC 682 and P-P interconnects 686 and 688. As illustrated in FIG. 6, MCs 672 and 682 couple processing elements 670, 680 to respective memories, namely a memory 632 and a memory 634, which may be portions of main memory locally attached to the respective processors. While MC logic 672 and 682 is illustrated as integrated into processing elements 670, 680, in some embodiments the memory controller logic may be discrete logic outside processing elements 670, 680 rather than integrated therein.

Processing element 670 and processing element 680 may be coupled to an I/O subsystem 690 via respective P-P interconnects 676 and 686 through links 652 and 654. As illustrated in FIG. 6, I/O subsystem 690 includes P-P interconnects 694 and 698. Furthermore, I/O subsystem 690 includes an interface 692 to couple I/O subsystem 690 with a high performance graphics engine 638. In one embodiment, a bus (not shown) may be used to couple graphics engine 638 to I/O subsystem 690. Alternately, a point-to-point interconnect 639 may couple these components.

In turn, I/O subsystem 690 may be coupled to a first link 616 via an interface 696. In one embodiment, first link 616 may be a Peripheral Component Interconnect (PCI) bus, or a bus such as a PCI Express bus or another I/O interconnect bus, although the scope of the present invention is not so limited.

As illustrated in FIG. 6, various I/O devices 614, 624 may be coupled to first link 616, along with a bridge 618 that may couple first link 616 to a second link 620. In one embodiment, second link 620 may be a low pin count (LPC) bus. Various devices may be coupled to second link 620 including, for example, a keyboard/mouse 612, communication device(s) 626 (which may in turn be in communication with the computer network 603), and a data storage unit 628 such as a disk drive or other mass storage device which may include code 630, in one embodiment. The code 630 may include instructions for performing embodiments of one or more of the techniques described above. Further, an audio I/O 624 may be coupled to second link 620.

Note that other embodiments are contemplated. For example, instead of the point-to-point architecture of FIG. 6, a system may implement a multi-drop bus or another such communication topology. Although links 616 and 620 are illustrated as busses in FIG. 6, any desired type of link may be used. In addition, the elements of FIG. 6 may alternatively be partitioned using more or fewer integrated chips than illustrated in FIG. 6.

Figure 7:
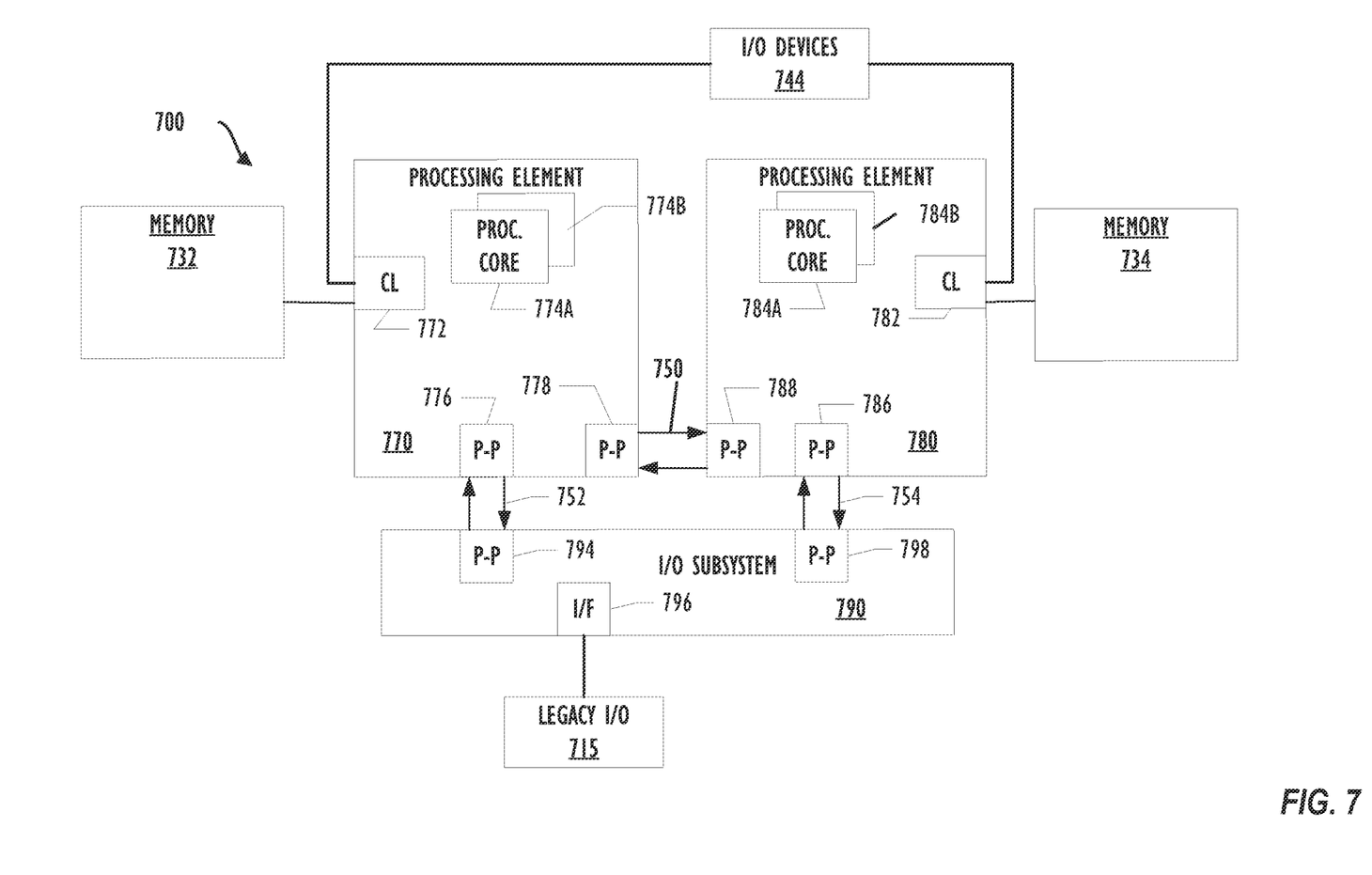
FIG. 7 is a block diagram illustrating a computing device that may be used as a node according to another embodiment.

Referring now to FIG. 7, a block diagram illustrates a programmable device 700 according to another embodiment. Certain aspects of FIG. 7 have been omitted from FIG. 7 in order to avoid obscuring other aspects of FIG. 7.

FIG. 7 illustrates that processing elements 770, 780 may include integrated memory and I/O control logic ("CL") 772 and 782, respectively. In some embodiments, the 772, 782 may include memory control logic (MC) such as that described above in connection with FIG. 6. In addition, CL 772, 782 may also include I/O control logic. FIG. 7 illustrates that not only may the memories 732, 734 be coupled to the CL 772, 782, but also that I/O devices 744 may also be coupled to the control logic 772, 782. Legacy I/O devices 715 may be coupled to the I/O subsystem 790 by interface 796. Each processing element 770, 780 may include multiple processor cores, illustrated in FIG. 7 as processor cores 774A, 774B, 784A and 784B. As illustrated in FIG. 7, I/O subsystem 790 includes point-to-point (P-P) interconnects 794 and 798 that connect to P-P interconnects 776 and 786 of the processing elements 770 and 780 with links 752 and 754. Processing elements 770 and 780 may also be interconnected by link 750 and interconnects 778 and 788, respectively.

The programmable devices depicted in FIGS. 6 and 7 are schematic illustrations of embodiments of programmable devices that may be utilized to implement various embodiments discussed herein. Various components of the programmable devices depicted in FIGS. 6 and 7 may be combined in a system-on-a-chip (SoC) architecture.

The following examples pertain to further embodiments.

Example 1 is a system, comprising: a first node that processes data stored in a first local storage device; a second node including a second local storage device; and a distributed cache in network communication with the first node and the second node, wherein the system is configured to: determine whether a size of the data stored in the first local storage device is greater than or equal to a predetermined threshold; and transfer a portion of the data stored in the first local storage device to the second local storage device via the distributed cache in response to a determination that the size of the data stored in the first local storage device is greater than or equal to the predetermined threshold.

In Example 2 the subject matter of Example 1 optionally includes wherein the predetermined threshold is a ratio of the size of the data stored in the first local storage device relative to a capacity of the first local storage device.

In Example 3 the subject matter of any of Examples 1 or 2 optionally includes wherein the first local storage device is in direct communication with the first node.

In Example 4 the subject matter of any of Examples 1 or 2 optionally includes wherein the first local storage device includes volatile memory.

In Example 5 the subject matter of any of Examples 1 or 2 optionally includes wherein the distributed cache includes nonvolatile memory.

In Example 6 the subject matter of any of Examples 1 or 2 optionally includes further comprising a controller that outputs instructions to the first node, the second node, and the distributed cache.

In Example 7 the subject matter of any of Examples 1 or 2 optionally includes wherein the first node periodically outputs information indicative of the data stored in the first local storage device to the distributed cache.

In Example 8 the subject matter of Example 7 optionally includes wherein the system is further configured to: determine whether the first node has experienced a failure; and transfer the information indicative of the data stored in the first local storage device from the distributed cache to the second local storage device in response to a determination that the first node has experienced a failure.

Example 9 is a method, comprising: storing data in a first local storage device in communication with a first node; determining whether a size of the data stored in the first local storage device is greater than or equal to a predetermined threshold; and transferring a portion of the data stored in the first local storage device to a second local storage device in direct communication with a second node via a distributed cache in response to a determination that the size of the data stored in the first local storage device is greater than or equal to the predetermined threshold.

In Example 10 the subject matter of Example 9 optionally includes wherein the predetermined threshold is a ratio of the size of the data stored in the first local storage device relative to a capacity of the first local storage device.

In Example 11 the subject matter of any of Examples 9 or 10 optionally includes wherein the first local storage device includes volatile memory.

In Example 12 the subject matter of any of Examples 9 or 10 optionally includes wherein the distributed cache includes nonvolatile memory.

In Example 13 the subject matter of any of Examples 9 or 10 optionally includes further comprising: periodically transferring information indicative of the data stored in the first local storage device to the distributed cache.

In Example 14 the subject matter of Example 13 optionally includes further comprising: transferring the information indicative of the data stored in the first local storage device from the distributed cache to a third local storage device in direct communication with a third node in response to a determination that the first node has experienced a failure.

Example 15 is a machine readable medium, on which are stored instructions, comprising instructions that when executed cause a machine to: determine whether a size of data stored in a first local storage device in communication with a first node is greater than or equal to a predetermined threshold; and transfer a portion of the data stored in the first local storage device to a second local storage device in direct communication with a second node via a distributed cache in response to a determination that the size of the data stored in the first local storage device is greater than or equal to the predetermined threshold.

In Example 16 the subject matter of Example 15 optionally includes wherein the predetermined threshold is a ratio of the size of the data stored in a first local storage device relative to a capacity of the first local storage device.

In Example 17 the subject matter of any of Examples 15 or 16 optionally includes wherein the first local storage device includes volatile memory.

In Example 18 the subject matter of any of Examples 15 or 16 optionally includes wherein the distributed cache includes nonvolatile memory.

In Example 19 the subject matter of any of Examples 15 or 16 optionally includes further comprising instructions that when executed cause the machine to: periodically transfer information indicative of the data stored in the first local storage device to the distributed cache.

In Example 20 the subject matter of any of Examples 15 or 16 optionally includes further comprising instructions that when executed cause the machine to: transfer the information indicative of the data stored in the first local storage device from the distributed cache to a third local storage device in direct communication with a third node in response to a determination that the first node has experienced a failure.

Example 21 is an apparatus comprising: a processor; and a memory coupled with the processor, on which are stored instructions, comprising instruction that when executed cause the processor to: determine whether a size of data stored in a first local storage device is greater than or equal to a predetermined threshold; and transfer a portion of the data stored in the first local storage device to a second local storage device in direct communication with a second node via a distributed cache in response to a determination that the size of the data stored in the first local storage device is greater than or equal to the predetermined threshold.

In Example 22 the subject matter of Example 21 optionally includes wherein the predetermined threshold is a ratio of the size of the data stored in a first local storage device relative to a capacity of the first local storage device.

In Example 23 the subject matter of any of Examples 21 or 22 optionally includes wherein the first local storage device includes volatile memory.

In Example 24 the subject matter of any of Examples 21 or 22 optionally includes wherein the distributed cache includes nonvolatile memory.

In Example 25 the subject matter of any of Examples 21 or 22 optionally includes further comprising instructions that when executed cause the processor to: periodically transfer information indicative of the data stored in the first local storage device to the distributed cache.

In Example 26 the subject matter of any of Examples 21 or 22 optionally includes further comprising instructions that when executed cause the processor to: transfer the information indicative of the data stored in the first local storage device from the distributed cache to a third local storage device in direct communication with a third node in response to a determination that the first local storage device has experienced a failure.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A system, comprising:
a first node to store data in a first local storage device;
a second node including a second local storage device;
a distributed cache separate from the first node and the second node, the distributed cache in communication with the first node and the second node via a network, the first node to:
when a size of the data stored in the first local storage device is less than a threshold, perform a plurality of backup operations to duplicate the data from the first local storage device to the distributed cache;
when the size of the data stored in the first local storage device is greater than or equal to the threshold: (a) send at least a portion of the data from the first local storage device to the distributed cache to reduce the size of the data stored in the first local storage device to be less than the threshold, and (b) output an instruction to transfer the at least the portion of the data from the distributed cache to the second local storage device; and
a controller to, in response to receiving the instruction from the first node, transfer the at least the portion of the data from the distributed cache to the second local storage device, the at least the portion of the data based on an attribute that is the same across multiple items of the at least the portion of the data.

2. The system of claim 1, wherein the threshold is a ratio of the size of the data stored in the first local storage device relative to a capacity of the first local storage device.

3. The system of claim 1, wherein the first local storage device is in direct communication with the first node.

4. The system of claim 1, wherein the first local storage device includes volatile memory.

5. The system of claim 1, wherein the distributed cache includes nonvolatile memory.

6. The system of claim 1, wherein the controller is further to provide instructions to the first node, the second node, and the distributed cache.

7. The system of claim 1, wherein the controller is further to:
transfer the at least the portion of the data from the distributed cache to the second local storage device in response to a determination that the first node has experienced a failure and based on the size of the data stored in the first local storage device being greater than or equal to the threshold.

8. A method, comprising:
storing data in a first local storage device of a first node;
performing, by executing a first instruction with a processor, a plurality of backup operations to duplicate the data from the first local storage device to a distributed cache when a size of the data stored in the first local storage device is less than a threshold;
sending, by executing a second instruction with the processor, at least a portion of the data from the first local storage device to the distributed cache via a network when the size of the data stored in the first local storage device is greater than or equal to the threshold, the sending of the at least the portion of the data to reduce the size of the data stored in the first local storage device to be less than the threshold; and
sending, by executing a third instruction with the processor, a fourth instruction from the first node to a controller, the fourth instruction to cause the controller to transfer the at least the portion of the data from the distributed cache to a second local storage device of a second node, the at least the portion of the data based on an attribute that is the same across multiple items of the at least the portion of the data.

9. The method of claim 8, wherein the threshold is a ratio of the size of the data stored in the first local storage device relative to a capacity of the first local storage device.

10. The method of claim 8, wherein the first local storage device includes volatile memory.

11. The method of claim 8, wherein the distributed cache includes nonvolatile memory.

12. The method of claim 8, further including:
transferring the at least the portion of the data from the distributed cache to a third local storage device of a third node in response to a failure of the first node, the transferring based on the size of the data stored in the first local storage device being greater than or equal to the threshold.

13. A storage device or storage disk comprising instructions that, when executed by a processor at a first node, cause the processor to at least:
store data in a first local storage device of the first node;
perform a plurality of backup operations to duplicate the data from the first local storage device to a distributed cache when a size of the data stored in the first local storage device is less than a threshold;
send at least a portion of the data from the first local storage device to the distributed cache via a network when the size of the data stored in the first local storage device is greater than or equal to the threshold, the processor to send the at least the portion of the data to reduce the size of the data stored in the first local storage device to be less than the threshold; and
instruct a controller to transfer the at least the portion of the data from the distributed cache to a second local storage device of a second node, the at least the portion of the data based on an attribute that is the same across multiple items of the at least the portion of the data.

14. The storage device or storage disk of claim 13, wherein the threshold is a ratio of the size of the data stored in the first local storage device relative to a capacity of the first local storage device.

15. The storage device or storage disk of claim 13, wherein the first local storage device includes volatile memory.

16. The storage device or storage disk of claim 13, wherein the distributed cache includes nonvolatile memory.

17. The storage device or storage disk of claim 13, wherein the instructions are further to cause the processor to:
instruct the controller to transfer the at least the portion of the data from the distributed cache to a third local storage device of a third node in response to a failure of the first node and based on the size of the data stored in the first local storage device being greater than or equal to the threshold.

18. The system of claim 1, wherein the first node is to perform the plurality of backup operations periodically when the size of the data stored in the first local storage device is less than the threshold.

19. The method of claim 8, wherein the performing of the plurality of backup operations is periodic.

20. The storage device or storage disk of claim 13, wherein the instructions are to cause the processor to perform the plurality of backup operations periodically.

* * * * *